Nov. 18, 1941.　　　O. S. FIELD　　　2,263,331

DIRECT CURRENT MOTOR

Filed June 7, 1940

INVENTOR
O. S. Field,
BY Neil W. Preston,
his ATTORNEY

Patented Nov. 18, 1941

2,263,331

UNITED STATES PATENT OFFICE 2,263,331

DIRECT CURRENT MOTOR

Oscar S. Field, Rochester, N. Y., assignor to General Railway Signal Company, Rochester, N. Y.

Application June 7, 1940, Serial No. 339,364

14 Claims. (Cl. 171—222)

The present invention relates in general to electric motors of the constant speed, self-starting, direct current type, and has more particular reference to an improved speed governor for such motors.

The present invention is an improvement on the invention disclosed in the pending Field application, Ser. No. 198,928, filed March 30, 1938, for "Direct current motor," now Patent 2,206,667, granted July 2, 1940.

The motor forming the subject matter of the present invention is of the same type as disclosed in the above referred to application and comprises a rotor which is preferably permanently magnetized, but which might be magnetized electro-magnetically, and a stator having windings which are controlled by the rotor so as to produce a rotating field to thereby drive the rotor.

The governing effect is produced by varying the contact control as the speed of the motor changes, whereby to vary the driving torque.

In the form of governor involved in the present disclosure, a cam is pinned to the shaft, so that it can tilt with reference to the shaft, and thereby vary its effect on the stator control contacts.

One of the objects of the present invention is to provide a cam of the character referred to which can tilt not only to an extent to weaken the forward driving rotating field down to the zero point, but under certain conditions to produce a retarding or backwardly rotating field, whereby to produce a very close governing action.

Another object of this invention is to provide means for balancing the various static pressures on the governing cam whereby to reduce to a negligible quantity any tilting of the cam on the shaft, and hence to prevent any governing means, other than that produced by the speed of rotation of the shaft.

Further objects, purposes and characteristic features of the present invention will appear as the description progresses, reference being made to the accompanying drawing, showing, in a wholly diagrammatic manner, and in no way whatsoever in a limiting sense, one form which the invention can assume. In the drawing.

Figure 2:
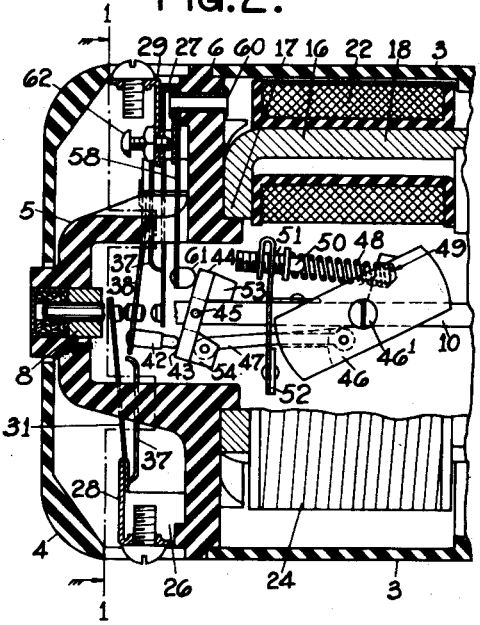
Fig. 2 is a sectional view on line 2—2 of Fig. 1, viewed in the direction of the arrows.

Referring now to the drawing, and first to Fig. 2, it can be seen that the motor is inclosed in a casing formed of insulating material, such as Bakelite, or other suitable material, and preferably is molded to the desired shape. It comprises a body portion 3, of general cylindrical shape, with a cap portion 4, and an intermediate portion 5, all fitting together as shown at 6, to thereby constitute a tight casing. The body portions 3 and 5 are held together by long bolts 7, or the like, here shown as two in number, and the cap portion 4 is held in place by means of a press fit, or in any other usual or desired manner.

Carried in the casing members 3 and 5 are bearings, only the bearing 8 in the intermediate portion 5 being shown in the drawing, and these bearings can be of bronze, or any other usual or desired material, and are molded in place in the carry members, or are pressed therein, as desired. Carried by these bearings is a shaft 10, having its right end, as viewed in Fig. 2, but not shown in the drawing, projecting beyond the bearing for receiving gears, and any other desired drive means.

Carried on shaft 10, and fixed to it to rotate therewith, is a rotor 13 (shown diagrammatically in Fig. 3), which is in the form of a relatively thin disc of hard magnetic steel, and preferably permanently magnetized in a given direction, as indicated by the arrow 14, but, as stated above, it can be electromagnetically magnetized if desired.

The stator with which rotor 13 cooperates, comprises a core structure, including a continuous ring-like portion 16, receivable on an inwardly projecting boss 17 on the casing part 5, and has four outwardly extending spaced parallel core legs 18, 19, 20 and 21, terminating in pole shoes positioned closely adjacent the periphery of the rotor, and enclosing the same. The cores are spaced from each other by 90°, and on each core is a winding, as 22, 23, 24, 25, arranged, when energized, to make the pole shoes of each core the same magnetically as that of each of the other cores, that is, either a north pole or a south pole.

Upon the outer face of the casing portion 5 are two projecting bosses 26 and 27 to which are respectively fixed two fixed contact carrying members 28 and 29, by means of rivets, or the like 30, which extend through the bosses and firmly attach the contact carrying members to the casing portion.

Carried by contact carrying member 28, which is made of conducting material, such as copper, are two fixed back contact fingers 31 and 32, made of suitable material, such as beryllium copper, which carry contact points 33 and 33[1], made of silver, or the like.

In like manner, member 29 carries two front contact fingers 34 and 35, having contact points 36 and 36[1]. All of the contact fingers are furnished with rigid stop members, such as 37, so as to definitely limit the movement of its finger in one direction.

Cooperating with the fixed back and front contacts are two movable contact fingers 38 and 39 having contact tips 38[1] and 39[1], with the fingers fastened to the casing by any suitable means 40.

Figure 1:
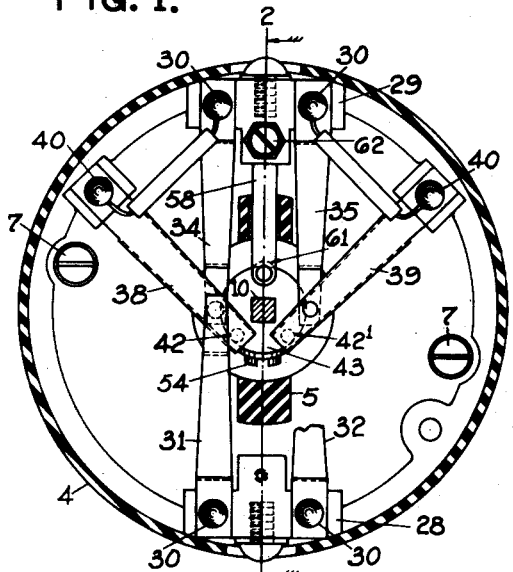
Fig. 1 is a sectional view on line 1—1 of Fig. 2, viewed in the direction of the arrows.

At the end of each movable contact finger, and beyond its contact points, is riveted or otherwise attached, a pusher member 42, and 42[1], each of which extends inwardly toward the other end of the motor, and parallel to shaft 10. These pushers, as can be best seen in Fig. 1, are positioned at 90° from each other, around shaft 10. The movable contact fingers are made of spring material, and have a bias inwardly, so as to cause the pushers to press against the flat face 43 of a cam member or operating means 44. This member 44 is in the form of a disc, and is carried on shaft 10 by a pin 45, whereby it can tilt with reference to the shaft, but cannot slide or rotate relatively to the shaft.

Adjacent cam 44 is a centrifugal governor 46 which is pinned to the shaft at 46[1] to permit it to swing outwardly at right angles to the shaft under the influence of centrifugal force, as the shaft rotates. The governor is connected to the cam by an operating rod or link 47, and is normally biased to a position against, and closely parallel to, the shaft, by a spring or the like 48, having one of its ends received in a socket 49 in the governor, and the other end received on a stud 50, carried by a threaded member 51 adjustably received in a fixed bracket 52. In this manner, the trapped spring tension can be varied for adjustment purposes so as to vary the speed of rotation of the shaft at which the governor moves from its shown position. Upon the governor moving with reference to the shaft the tilt of the cam 44 is varied so as to bring it closed to a position at right angles to the shaft and hence vary its effect on the movable contact fingers 38 and 39, as will appear more clearly in the description to follow.

It should be noted that cam 44 has shoulders 53 and 54, which determine the extreme positions which the cam can assume with respect to the shaft. As shown in Fig. 2, the cam is in its initial position with shoulder 53 bearing against the shaft 10. The other extreme position of the cam is arrived at with the other shoulder 54 bearing against the outer side of the shaft, and the cam tilted to the shaft in the reverse direction.

In this form of governor, upon the speed of the shaft reaching a value where the centrifugal force is sufficient to overcome the trapped tension in spring 48, the governor 46 turns on its pin 46[1] in a counterclockwise direction as viewed in Fig. 2, to move link 47 and tilt the cam to progressively bring it closer to a position at right angles to the shaft.

The principle of operation of this motor is described in detail in the application referred to above, and accordingly, in this continuation-in-part application it appears necessary to give only a very brief description of its principle of operation.

Figure 3:
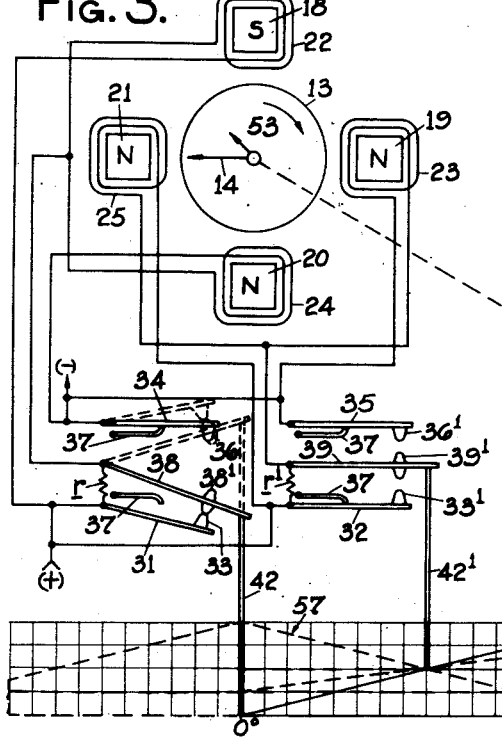
Fig. 3 is a schematic view of the magnetic structure and circuits of the motor.

As shown in Fig. 3, the windings on the stator cores are energized from a source of direct current, designated by the symbols (+) and (−) whereby to make the pole shoes all of the same polarity, as, for example, north polarity. As the cam 44 rotates with the shaft, it moves the pushers on the movable contact fingers so as to make up various front and back points, and thereby shunt out various of the stator windings.

In Fig. 3, the operating cam 44 has been shown in developed form, and its effect on the pushers can be understood from this figure by considering that one complete rotation of the cam is the same as moving the developed cam of Fig. 3 in a horizontal direction beneath pushers 42 and 42[1], whereby to raise these pushers and then lower them.

While the slope of the cam in its initial position can be varied, and the spacing between front and back contacts can also be varied, in order that the motor be self-starting, these quantities have been so chosen that with the cam at its initial inclination to the shaft, the movable contacts travel 45° between breaking one contact and making the other, while each of the contacts is closed during a travel of 135°.

For example, as shown in Fig. 3, the movable contact 38 is making contact with back contact 33, whereby to shunt out winding 22 so that the resulting polarity of the rotor, due to this alone, is in an upward direction as viewed in the drawing. Due to inductance, however, and the fact that just previously winding 25 had been unshunted, the resulting stator field is, as represented, in the direction of the arrow 53.

The rotor is accordingly attracted by the stator field, and turns in a clockwise direction. Upon a movement, in this case of 22½°, the movable contact 39 makes up with the front contact 35 to thereby shunt out stator winding 23, and upon a further movement of 45°, winding 22 is unshunted, whereby the stator field progresses gradually from its shown position 53 to a position passing through core 19, thus to rotate in a clockwise direction ahead of the rotor, and produce a drive torque in a clockwise direction.

In the example shown, each winding is shunted during a travel of 135°, and the successive winding is shunted at a point 35° before the preceding winding is unshunted, whereby to produce an overlap of 45°, and insure that, regardless of where the motor may stop, there will be an existing stator field ahead of the rotor field whereby to cause the motor to be self-starting.

Upon changing the connections to the motor by reversing the connections (+) and (−), the motor operates in the reverse direction.

For protecting the contacts against undue pitting and burning, resistances $r$ and $r^1$ are connected, as shown in Fig. 3.

As the motor increases in speed the tilt of the cam decreases and gradually assumes a flatter and flatter position, as can be seen in the developed form of Fig. 3, by the dotted representation 56, whereby to increase the amount of rotation during travel of the movable contact fingers between the front and back contacts, and to decrease the amount of travel during the time the movable contacts are in contact with the front and back contacts. This decreases the duration and the intensity of the driving rotating field, and thus decrease the drive torque, and produces the governing action desired. It can be seen that, as the cam approaches a position at right angles to the shaft, it will reach a point where the movable contact fingers will move back and forth without making up any contacts, at which time the driving field is, of course, zero.

Due to sudden changes in voltage, or in load, or to both, it is possible that sufficient momentum may be present in the moving parts of the motor to cause the cam to swing beyond the right angle position and assume a tilt in the other direction. Furthermore, the rotating field produced by the cam may be sufficiently irregular throughout any complete rotation, and vary so much in strength at various points, as to thereby cause the throw of the cam beyond the right angle position under various critical conditions.

Regardless of the particular cause for the cam moving beyond the right angle position, when it assumes a tilt in the opposite direction to that shown in Fig. 2, sufficiently to cause making up of contacts, its effect on the rotating field is to produce a rotating field in the reverse direction, and thus not only to extinguish the driving field, but to produce a braking field which, if it persisted, would cause the motor to reverse. This braking field, of course, exists at most only momentarily, and thus produces a braking effect which gives a very close governing action and maintains the speed of the motor under wide variations of load and applied voltage, within very narrow limits.

It can be seen from a consideration of Fig. 3, that a sudden reversal of the tilt of the governing cam amounts to the same thing in its developed form, as if the slope 44¹, shown as under the pushers 42 and 42¹ should be reversed so as to slope as shown at 57. Under these conditions, the winding which is shunted next after the shunting of winding 22, is the winding 25, instead of the winding 23. In other words, with the windings shunted in the order of 22, 23, 24, etc., the rotating field produced by the stator is in a clockwise direction. Upon the cam tilting beyond the right angle position sufficiently to cause closing of contacts, the order of shunting of the windings becomes 22, 25, 24, etc., whereby to produce a counterclockwise rotation of the field, and hence a braking effect on the motor.

It has been found that, by constructing the operating cam and governor so that the cam can swing beyond the right angle position, improved governing effects are produced. Furthermore, should the cam be constrained against moving beyond the right angle position by stop means, for example, it is possible the cam might swing to the stop position and then rebound from the stop to a position where it immediately produced a relatively strong forward driving field, whereby to cause the cam to again hit the stop and rebound, so as to cause wide variations in speed and a much less close governing action than is realized with the present construction.

The operating cam when swung to a position at right angles to the shaft, has been represented in its developed form, by line 63, while in its position where tilted beyond the right angle position, it is represented in its developed form, by curve 57.

Figure 4:
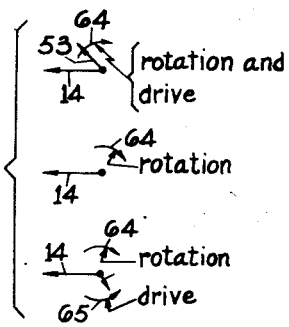
Fig. 4 is a schematic showing of the various forces and motions involved during the governing operation of the motor.

In Fig. 4 is diagrammatically represented the conditions existing when the cam is tilted, as shown in Fig. 2, the conditions existing when the cam has moved to a position where no contacts are closed, and the condition where the cam has moved so as to close contacts and produce a reverse drive field.

In this Fig. 4, the rotor field is represented, as before, by the arrow 14, and the stator field, under the first condition, by the arrow 53, with the drive torque resulting, and the direction of rotation, both being in a clockwise direction, as represented by arrow 64.

Under the second condition, where the control cam has moved to a position where no contacts are closed, the direction of rotation, represented by arrow 64, is still in a clockwise direction, but the drive torque has completely disappeared, and accordingly, no arrow representing a driving field is present, but the rotation continues solely due to momentum.

Under the third condition, where the cam has tilted beyond the right angle position sufficiently to produce a rotating field in the opposite direction, the direction of rotation, despite the momentary braking action, is represented as in a clockwise direction, by the arrow 64, while the rotating field and drive torque is represented by arrow 65, as being in a counterclockwise direction.

In this Fig. 4, no attempt has been made to represent accurate angular relationships and magnitudes of the forces involved, other than to show them in their proper relative positions.

It can be realized from the above disclosure, that the cam operating the contacts, and biased by spring 48, to an initial position, should not swing from this position due to any influence other than that of the speed of the motor, as otherwise the governing action is interfered with and the governing effect is not the best.

As seen from Fig. 2, pushers 42 and 42' bear against the cam under some little spring pressure, and in the position shown tend to rock the cam in a counter-clockwise direction. The biasing spring 48, on the other hand, is biasing the cam in a clockwise direction. Thus, the pushers and the biasing spring are opposing each other. Since the spring and centrifugal governor and cam all move with the shaft, upon a rotation of 180° the bias of spring 48 and the pressures exerted by the pushers are relatively reversed so that the biasing spring and the pushers aid each other in exerting a bias on the cam. Accordingly, unless means be provided to off-set this undesirable feature, through every rotation of 360° of the cam, the condition will change from an extreme where the pushers directly oppose the biasing spring, to a condition where they directly aid it, and thus tend to cause cam movement with resulting variation in driving field and speed of rotation, throughout each complete rotation of the shaft 10.

A balancing pusher has been supplied to remedy this undesirable feature in the form of a spring arm 58, carried by the casing by a rivet or the like 60, and having a pushing member 61 at its end which bears against control cam 44 at a point opposite to, and symmetrical with, the two pushers 42 and 42'. The pressure exerted by this balancing pusher can be adjusted by a screw 62, carried by bracket 29, and is preferably so adjusted that its pressure balances the pressures exerted by the operated pushers 42 and 42'.

The movable spring contact fingers 38 and 39 and the spring pusher finger 58 are all relatively long flexible members so designed as to have spring pile up curves that are substantially horizontal straight line curves, whereby any changes in spring pressures due to rotation of the cam 44, and due to changes of the tilt of the cam during its governing action, are wholly negligible. Thus, all harmful unbalance of pressures has been completely eliminated.

As a result, throughout a complete rotation of shaft 10, and regardless of the cam tilt, the pressures exerted on the cam by the three pushers, i. e., the static pressures, are substantially balanced, and have practically no tendency to cause the cam to rock relatively to the shaft. Accordingly, movements of the control cam are due almost solely to changes in speed, and the governing action is far superior to what would be obtained, were the balancing pusher omitted.

In producing the rotors for the above motors, it has been discovered that they varied in uniformity, although treated alike. This has been found to be due to lack of homogeneousness of the material. Upon operation, it was found that considerable variation in operating characteristics existed, particularly between forward and reverse operation of the motor.

Accordingly, before magnetizing the rotors, they are X-rayed, and the direction of the polarity of the magnetization is chosen so as to be symmetrically positioned with reference to spongy, or over dense, portions of the metal.

Figure 5:
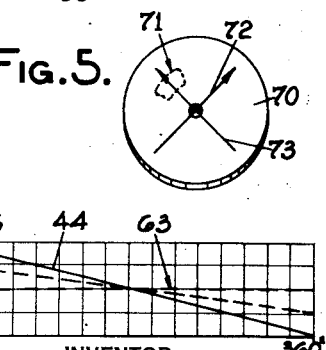
Fig. 5 is a schematic view of a motor rotor.

For example, in Fig. 5, a rotor 70, as X-rayed, is shown. This rotor has an area 71, which is either more dense, or less dense, than the rest of the metal. Should the member be magnetized to have a polarity as represented by arrow 72, an unsymmetrical distribution of flux would result with a resulting irregular operation of the motor.

By choosing the direction of the polarity of the magnetism, as indicated by arrow 73, i. e., symmetrical with the area 71, the motor operation is much improved, and forward and reverse operating characteristics are substantially identical.

The above rather specific description of one form which this invention can assume has been given solely by way of example, and is not intended, in any manner whatsoever, in a limiting sense. It is to be understood that various modifications, adaptations and alterations may be applied, from time to time, to meet the requirements of practice, without in any manner departing from the spirit or scope of the present invention, except as limited by the appended claims.

Having described my invention, I now claim:

1. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a contact control member pivoted to the shaft to tilt relatively thereto and positioned to bear against, and to operate, the contacts, as the shaft turns, and pressure means acting on the member to substantially balance all static forces tending to change the tilt of the member to its shaft, regardless of the rotative position of the shaft.

2. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a flat control cam pivoted to the shaft so as to permit only tilting movement of the cam relatively to the shaft, contact pushers fixed relatively to the shaft and biased against the cam and operatively associated with said contacts for operating the same as the shaft turns, and balancing means acting on the cam so as to substantially balance all static forces, which act on the cam and tend to change the tilt of the cam to its shaft, at all rotated and tilted positions of the cam.

3. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a flat control cam pivoted to the shaft to permit only tilting movement of the cam relatively to the shaft, contact pushers fixed relative to the shaft and biased against the cam and operatively associated with said contacts for operating the same as the shaft turns, balancing means operating on the cam to substantially balance all static forces, acting on the cam and tending to change its tilt to its shaft, at all positions of the cam, elastic means carried by the shaft and biasing the cam to an initial tilted position, and centrifugal governing means on the shaft, operatively associated with the cam, to change the tilt of the cam in accordance with the speed of rotation of the shaft.

4. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a flat control cam pivoted to the shaft to permit only tilting movement of the cam relatively to the shaft, contact pushers fixed relatively to the shaft and biased against the cam and operatively associated with said contacts for operating the same as the shaft turns, balancing means operating on the cam to substantially balance all static forces acting on the cam tending to change its tilt to its shaft at all positions of the cam, elastic means carried by the shaft and biasing the cam to an initial tilted position, and centrifugal governing means on the shaft operatively associated with the cam and acting to change the tilt of the cam in accordance with the speed of rotation of the shaft, said elastic means biasing the cam to a position at one side of the right angle position of the cam on the shaft.

5. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a flat control cam pivoted to the shaft to permit only tilting movement of the cam relatively to the shaft, contact pushers fixed relatively to the shaft and biased against the cam and operatively associated with said contacts for operating the same as the shaft turns, balancing means operating on the cam to substantially balance all static forces acting on the cam and tending to change its tilt to the shaft at all rotative and tilted positions of the cam, elastic means carried by the shaft and biasing the cam to an initial tilted position, and centrifugal governing means on the shaft operatively associated with the cam to change the tilt of the cam as the speed of rotation of the shaft changes, the elastic means biasing the cam to a position at one side of the right angle position of the cam on the shaft, said cam being tiltable on the shaft a substantial amount to the other side of said right angle position.

6. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a control means on the shaft positioned to operate the contacts as the shaft turns so as to produce a driving rotating field in the stator to react with the rotor field, a centrifugal governor responsive to turning of the shaft and movable, as the speed increases, to progressively change the relationship of the control means to the contacts so as to progressively decrease the drive torque the control means being movable to a position where the drive torque becomes zero and then is reversed.

7. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a control means on the shaft positioned to operate the contacts as the shaft turns so as to produce a driving rotating field in the stator to react with the rotor field, a centrifugal governor controlled by the shaft and movable to change the relationship of the control means to the contacts so as to decrease the drive torque between the rotor and stator fields as the speed increases, elastic means movable relatively to the said contacts and opposing the governor movement occurring under the influence of centrifugal force, and means substantially balancing all static forces other than those of said elastic means, tending to change the relationship of the control means to the contacts in every position of the control means.

8. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a control means on the shaft positioned to operate the contacts as the shaft turns so as to produce a driving rotating field in the stator to react with the rotor field, a centrifugal governor controlled by the shaft and movable as the speed increases, to progressively change the relationship of the control means to the contacts so as to progressively decrease the drive torque the control means being movable to the position where the drive torque is zero and to a position a distance substantially beyond this zero position, elastic means movable relatively to the said contacts and opposing the governor movement under the influence of centrifugal force, and means substantially balancing all static forces other than those of the elastic means which tend to change the relationship of the control means to the contacts in every position of the control means.

9. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a control means on the shaft for operating the contacts to produce a rotating field in the stator, a centrifugal governor pinned to the shaft and operatively connected to the control means to respond to rotation of the shaft, as the speed of rotation increases, to progressively move the control means so as to vary the control of the stator windings and make all of the windings progressively less effective to produce flux, the control means being movable to the position where no field exists in the stator, and then beyond this position to the position to produce a reverse stator field.

10. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, control means on the shaft for operating the contacts to produce a rotating field in the stator, a governor pinned to the shaft, and movable outwardly from the shaft as the speed of the shaft increases, a flat face on the control means for operating the contacts, means pivoting the control means to the shaft, a connection between the governor and the control means, means biasing the control means to a position where its face is at an angle to the axis of the shaft, movement of the governor, upon increase of speed of the shaft, changing the tilt of the face of the control means, so as to make all of the windings on the stator progressively less effective in producing flux, and means substantially balancing all forces, other than centrifugal force and that of the biasing means, tending to change the tilt of the control member to its shaft in all positions of the control member.

11. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, control means on the shaft for operating the contacts to produce a rotating field in the stator, a governor pinned to the shaft and movable outwardly from the shaft as the speed of the shaft increases, a flat face on the control means for operating the contacts, means pivoting the control means to the shaft, a connection between the governor and the control means, means biasing the control means to a position where its face is at an angle to the axis of the shaft, means whereby movement of the governor, upon increase of speed of the shaft, changes the tilt of the face of the control means so as to make each of the windings on the stator progressively less effective in producing flux, down to the zero point, and then to produce flux constituting a field rotating in the reverse direction.

12. In a reversible motor, in combination, a stator, means on the stator for producing a rotating field in either a forward, or a reverse, direction, a shaft, a rotor of magnetic material on the shaft and positioned to be acted upon by the rotating field, the rotor being magnetized in a direction to be poled symmetrically with respect to the rotor as a whole and to all non-homogeneous portions of the rotor.

13. In a reversible motor, in combination, a stator, means on the stator for producing a rotating field in either a forward, or a reverse, direction, a shaft, a rotor of magnetic material on the shaft and positioned to be acted upon by the rotating field, the rotor being permanently magnetized in a direction to be poled symmetrically with respect to the rotor as a whole and to all non-homogeneous portions of the rotor.

14. In a motor, in combination, a stator, means on the stator for producing a rotating field, a shaft, a rotor of magnetic material on the shaft and positioned to be acted upon by the rotating field, the rotor being magnetized in a direction to be poled symmetrically with respect to the rotor as a whole and to all non-homogeneous portions of the rotor.

OSCAR S. FIELD.